United States Patent
DeLawter et al.

(10) Patent No.: US 11,030,622 B2
(45) Date of Patent: Jun. 8, 2021

(54) CARD SYSTEMS AND METHODS

(71) Applicant: Early Warning Services, LLC, Scottsdale, AZ (US)

(72) Inventors: David DeLawter, Chandler, AZ (US); Janis Simm, Scottsdale, AZ (US); Chris Parker, Scottsdale, AZ (US); Robert Hill, Mill Creek, WA (US)

(73) Assignee: Early Warning Services, LLC, Scottsdale, AZ (US)

( * ) Notice: Subject to any disclaimer, the term of this patent is extended or adjusted under 35 U.S.C. 154(b) by 727 days.

(21) Appl. No.: 15/179,839

(22) Filed: Jun. 10, 2016

(65) Prior Publication Data
US 2016/0364728 A1    Dec. 15, 2016

Related U.S. Application Data

(60) Provisional application No. 62/174,432, filed on Jun. 11, 2015.

(51) Int. Cl.
| | |
|---|---|
| *G06Q 20/40* | (2012.01) |
| *G06F 21/62* | (2013.01) |
| *G06F 21/55* | (2013.01) |
| *G06F 21/57* | (2013.01) |
| *G06Q 20/20* | (2012.01) |
| *G06Q 20/38* | (2012.01) |

(52) U.S. Cl.
CPC ......... *G06Q 20/4016* (2013.01); *G06F 21/55* (2013.01); *G06F 21/552* (2013.01); *G06F 21/577* (2013.01); *G06F 21/6218* (2013.01); *G06Q 20/202* (2013.01); *G06Q 20/389* (2013.01); *G06Q 20/4014* (2013.01)

(58) Field of Classification Search
CPC ..................................................... G06Q 20/40
USPC .......................................................... 705/44
See application file for complete search history.

(56) References Cited

U.S. PATENT DOCUMENTS

| | | | |
|---|---|---|---|
| 5,884,289 A | 3/1999 | Anderson et al. | |
| 6,094,643 A * | 7/2000 | Anderson .............. | G06Q 20/04 235/379 |
| 6,584,467 B1 * | 6/2003 | Haught .................. | G06Q 40/08 |
| 7,263,506 B2 * | 8/2007 | Lee ......................... | G06Q 20/04 705/318 |
| 7,403,922 B1 * | 7/2008 | Lewis ................ | G06Q 10/0635 705/38 |
| 8,065,233 B2 * | 11/2011 | Lee ......................... | G06Q 20/04 705/36 R |

(Continued)

*Primary Examiner* — Narayanswamy Subramanian
*Assistant Examiner* — Ayal I. Sharon
(74) *Attorney, Agent, or Firm* — Kilpatrick Townsend & Stockton LLP

(57) ABSTRACT

Systems and methods for identifying potentially illicit purchases, especially in card-not-present transactions. In one implementation, a merchant transaction system comprises a processor and memory. The system receives a transaction request from a customer for a card-not-present sale transaction. The system transmits over an electronic network a transaction risk request message to a transaction risk evaluator, and receives over the electronic network a reply message from the transaction risk evaluator, indicating a level of risk associated with the sale transaction. The system can decide whether to proceed with the card-not-present sale transaction based at least in part on the content of the reply message.

15 Claims, 11 Drawing Sheets

| MERCHANT ID (ID for merchant where card has been used) | Backtracing Day | CLAIM DATE | CLAIMS | MERC |
|---|---|---|---|---|
| 8788430112639 | Day 1 | 12/4/2013 | 2 | 66 |
| 8788430112639 | Day 20 | 12/23/2013 | 1 | 58 |
| 8788430112639 | Day 21 | 12/24/2013 | 1 | 44 |
| 8788430112639 | Day 32 | 1/4/2014 | 1 | 62 |
| 8788430112639 | Day 37 | 1/9/2014 | 2 | 100 |
| 8788430112639 | Day 42 | 1/14/2014 | 2 | 159 |
| 8788430112639 | Day 52 | 1/24/2014 | 1 | 246 |
| 8788430112639 | Day 77 | 2/19/2014 | 1 | 95 |
| 8788430112639 | Day 79 | 2/21/2014 | 47 | 31 |
| 8788430112639 | Day 80 | 2/22/2014 | 31 | 35 |
| 8788430112639 | Day 81 | 2/23/2014 | 10 | 106 |
| 8788430112639 | Day 82 | 2/24/2014 | 33 | 58 |
| 8788430112639 | Day 83 | 2/25/2014 | 54 | 10 |
| 8788430112639 | Day 84 | 2/26/2014 | 22 | 41 |

410

(56) References Cited

U.S. PATENT DOCUMENTS

| | | | | |
|---|---|---|---|---|
| 8,600,872 B1 | 12/2013 | Yan | | |
| 9,230,066 B1* | 1/2016 | Bailey | ................ | H04W 12/06 |
| 9,747,598 B2* | 8/2017 | Mogollon | ............. | G06Q 20/12 |
| 9,898,739 B2* | 2/2018 | Monastyrsky | ..... | G06Q 20/4016 |
| 2002/0194119 A1* | 12/2002 | Wright | ................ | G06Q 20/04 |
| | | | | 705/38 |
| 2004/0006532 A1* | 1/2004 | Lawrence | ......... | H04L 29/12009 |
| | | | | 705/38 |
| 2005/0021476 A1* | 1/2005 | Candella | ............ | G06Q 20/4014 |
| | | | | 705/64 |
| 2005/0108102 A1* | 5/2005 | York | ..................... | G06Q 30/06 |
| | | | | 705/26.41 |
| 2005/0108151 A1* | 5/2005 | York | ..................... | G06Q 10/10 |
| | | | | 705/38 |
| 2005/0108178 A1* | 5/2005 | York | ..................... | G06Q 20/00 |
| | | | | 705/75 |
| 2005/0279827 A1* | 12/2005 | Mascavage | ............ | G06Q 20/02 |
| | | | | 235/380 |
| 2007/0174164 A1* | 7/2007 | Biffle | ..................... | G06Q 20/02 |
| | | | | 705/35 |
| 2008/0288405 A1* | 11/2008 | John | ..................... | G06Q 20/40 |
| | | | | 705/44 |
| 2009/0171682 A1* | 7/2009 | Dixon | .................... | G06Q 20/20 |
| | | | | 705/346 |
| 2009/0313134 A1* | 12/2009 | Faith | .................... | G06Q 20/105 |
| | | | | 705/26.1 |
| 2010/0223186 A1* | 9/2010 | Hogan | .................... | G06Q 20/02 |
| | | | | 705/71 |
| 2010/0312617 A1* | 12/2010 | Cowen | ................. | G06Q 20/105 |
| | | | | 705/13 |
| 2011/0047075 A1* | 2/2011 | Fourez | .................... | G06Q 20/32 |
| | | | | 705/44 |
| 2011/0184838 A1* | 7/2011 | Winters | ................. | G06Q 20/10 |
| | | | | 705/27.1 |
| 2011/0191162 A1* | 8/2011 | Blackhurst | ............. | G06Q 20/40 |
| | | | | 705/14.39 |
| 2011/0282789 A1* | 11/2011 | Carroll | ................... | G06Q 20/18 |
| | | | | 705/44 |
| 2012/0197802 A1* | 8/2012 | Smith | ..................... | G06Q 20/12 |
| | | | | 705/44 |
| 2012/0203698 A1* | 8/2012 | Duncan | .................. | G06Q 20/34 |
| | | | | 705/44 |
| 2012/0226613 A1* | 9/2012 | Adjaoute | ............... | G06Q 40/02 |
| | | | | 705/44 |
| 2012/0239574 A1* | 9/2012 | Smith | ................ | G06Q 20/4014 |
| | | | | 705/44 |
| 2013/0218758 A1* | 8/2013 | Koenigsbrueck | ...... | G06Q 40/02 |
| | | | | 705/39 |
| 2013/0232074 A1* | 9/2013 | Carlson | .................. | G06Q 20/42 |
| | | | | 705/44 |
| 2014/0012724 A1 | 1/2014 | O'Leary et al. | | |
| 2014/0122325 A1* | 5/2014 | Zoldi | ................. | G06Q 20/4016 |
| | | | | 705/39 |
| 2014/0164253 A1* | 6/2014 | Dominguez | ........... | G06Q 20/40 |
| | | | | 705/67 |
| 2014/0310176 A1* | 10/2014 | Saunders | ............. | G06Q 20/405 |
| | | | | 705/44 |
| 2015/0073981 A1* | 3/2015 | Adjaoute | ........... | G06Q 20/4016 |
| | | | | 705/39 |
| 2015/0081461 A1* | 3/2015 | Adrangi | ................. | G07G 1/009 |
| | | | | 705/17 |
| 2015/0095990 A1* | 4/2015 | Ranganathan | ..... | G06Q 20/4016 |
| | | | | 726/4 |
| 2015/0106260 A1* | 4/2015 | Andrews | ........... | G06Q 20/4016 |
| | | | | 705/39 |
| 2015/0127547 A1* | 5/2015 | Powell | ................. | G06Q 20/382 |
| | | | | 705/67 |
| 2015/0269578 A1* | 9/2015 | Subramanian | ...... | G06Q 20/4016 |
| | | | | 705/44 |
| 2016/0078444 A1* | 3/2016 | Tomasofsky | ........... | G06Q 20/36 |
| | | | | 705/44 |
| 2016/0087952 A1* | 3/2016 | Tartz | ..................... | H04L 63/105 |
| | | | | 455/411 |
| 2016/0203485 A1* | 7/2016 | Subramanian | ......... | G06Q 30/00 |
| | | | | 705/44 |
| 2016/0364727 A1* | 12/2016 | DeLawter | .......... | G06Q 20/4014 |

* cited by examiner

| MERCHANT ID (ID for merchant where card has been used) | Backtracing Day | CLAIM DATE | CLAIMS | MERC |
|---|---|---|---|---|
| 8788430112639 | Day 1 | 12/4/2013 | 2 | 66 |
| 8788430112639 | Day 20 | 12/23/2013 | 1 | 58 |
| 8788430112639 | Day 21 | 12/24/2013 | 1 | 44 |
| 8788430112639 | Day 32 | 1/4/2014 | 1 | 62 |
| 8788430112639 | Day 37 | 1/9/2014 | 2 | 100 |
| 8788430112639 | Day 42 | 1/14/2014 | 2 | 159 |
| 8788430112639 | Day 52 | 1/24/2014 | 1 | 246 |
| 8788430112639 | Day 77 | 2/19/2014 | 1 | 95 |
| 8788430112639 | Day 79 | 2/21/2014 | 47 | 31 |
| 8788430112639 | Day 80 | 2/22/2014 | 31 | 35 |
| 8788430112639 | Day 81 | 2/23/2014 | 10 | 106 |
| 8788430112639 | Day 82 | 2/24/2014 | 33 | 58 |
| 8788430112639 | Day 83 | 2/25/2014 | 54 | 10 |
| 8788430112639 | Day 84 | 2/26/2014 | 22 | 41 |

410 → (row for Day 79)

FIG. 4

WEBMART CHECKOUT

Your shopping cart contains:

| | | |
|---|---|---|
| 1 ea. | LCD Televsion 55", model LCDTV 99999 | $899.00 |
| 1 ea. | Fastcorp Laptop Computer, 12", 8GB, 500GB | $599.00 |
| | Subtotal | $1498.00 |
| | Tax | $89.88 |
| | Total | $1587.88 |

Please enter payment information

Card No [ 1234567812345678 ]
Expiration [ 03/2019 ]

Billing Address
[ 123 Main St. ]
[ ]
City [ Anytown ]  State [ NY ]  ZIP [ 00000 ]

Shipping Address
[ 321 Minor Ave. ]
[ ]
City [ Cityville ]  State [ NY ]  ZIP [ 00000 ]

Your email address [ buyer@emailco.com ]

Your phone number [ 212-555-9999 ]

[ CONFIRM ORDER ]

FIG. 8

| Field # | Field Definition |
|---|---|
| 1 | AccountNumber |
| 2 | CardholderFirstName |
| 3 | CardholderLastName |
| 4 | DfsTrackingId |
| 5 | AddressProvidedIsStandardized |
| 6 | BillingEmailAddress |
| 7 | BillingCountryCode |
| 8 | BillingCity |
| 9 | BillingPostalCode |
| 10 | BillingStateCode |
| 11 | BillingStreetName |
| 12 | BillingStreetNumber |
| 13 | TransactionAmount |
| 14 | TransactionDate |
| 15 | NoDeliveryAddress |
| 16 | DeliveryAddressIsSameAsBilling |
| 17 | PurchaseIncludesAirlineTicketIndicator |
| 18 | PurchaseIncludesGiftCardIndicator |
| 19 | MerchantNumber |
| 20 | BillingHomePhone |
| 21 | BillingMobilePhone |
| 22 | IpAddress |
| 23 | CardholderfirstName shipping |
| 24 | CardholderLastName shipping |
| 25 | ShippingCountryCode |
| 26 | ShippingEmailAddress |
| 27 | ShippingCity |
| 28 | ShippingPostalCode |
| 29 | ShippingStateCode |
| 30 | ShippingStreetName |
| 31 | ShippingStreetNumber |
| 32 | ShippingHomePhone |
| 33 | ShippingMobilePhone |

FIG. 10

| Field # | Field Definition | Example |
|---|---|---|
| 1 | AccountNumberMatch | |
| 2 | FirstNameMatch | |
| 3 | LastNameMatch | |
| 4 | Fraud Risk Score | |
| 5 | Reason Code #1 | 10 |
| 6 | Reason Code #1 Description | Suspicious Name |
| 7 | Reason Code #2 | 20 |
| 8 | Reason Code #2 Description | Suspicious Address |
| 9 | Reason Code #3 | 30 |
| 10 | Reason Code #3 Description | Suspicious Phone |
| 11 | Reason Code #4 | 40 |
| 12 | Reason Code #4 Description | Suspicious Email |
| 13 | Reason Code #5 | 50 |
| 14 | Reason Code #5 Description | Compromise Card History |
| 15 | BillingEmailAddress | |
| 16 | BillingCountryCode | |
| 17 | BillingCity | |
| 18 | BillingPostalCode | |
| 19 | BillingStateCode | |
| 20 | BillingStreetName | |
| 21 | BillingStreetNumber | |
| 22 | BusinessPhoneMatch | |
| 23 | CityMatch | |
| 24 | CfxTrackingId | |
| 25 | EmailAddressMatch | |
| 26 | PostalCodeMatch | |
| 27 | PrimaryPersonalPhoneMatch | |
| 28 | RegAddrSuccessfullyStandardized | |
| 29 | SecondaryPersonalPhoneMatch | |
| 30 | StateMatch | |
| 31 | StreetNameMatch | |
| 32 | StreetNumberMatch | |
| 33 | StdCity | |
| 34 | StdPostalCode | |
| 35 | StdStateCode | |
| 36 | StdStreetName | |
| 37 | StdStreetNumber | |

FIG. 11

CARD SYSTEMS AND METHODS

This application claims the benefit of Provisional U.S. Patent Application No. 62/174,432 filed Jun. 11, 2015 and titled "System and Method for Identifying Compromised Accounts", the entire disclosure of which is hereby incorporated by reference herein for all purposes.

FIELD OF THE INVENTION

Embodiments of the invention relate to processing systems and methods.

BACKGROUND OF THE INVENTION

Illicit credit card and other financial transactions are often attempted by persons or entities with a history of illicit or questionable activity. However, computer systems used for automated monitoring for such activity may not have access to sufficient data or resources to detect such activities.

Fraudulent credit card and other financial transactions often result from breached or compromised systems that store account data. As an example, fraudsters may "hack" into a retailer/merchant system and steal credit card information of the merchant's customers, and then subsequently use that credit card information to conduct fraudulent transactions.

Much of the fraudulent activity that is conducted today involves at least two persons or entities, namely, a first entity that unlawfully accesses and steals the account data, and then a second entity that purchases the stolen account data and attempts to conduct a transaction using the data.

Entities that unlawfully gain access to systems to steal data have become sophisticated in their approaches to accessing the data and then turning around and selling the data to other entities. Fraudsters are able to access extensive card data (involving thousands, if not millions, of account holders) by installing malicious software at a system where data is maintained, such as at a retailer system where card data is accumulated during transactions at the retailer. In other cases, a fraudster may attach a "skimmer" to a terminal (such as a point-of-sale terminal or an ATM) where customers may swipe a card and unknowingly provide card data to the fraudster. Where systems are hacked or skimmers are used, the activity may occur over a substantial period of time and result in continuously capturing new card data as it is collected at the compromised system, thereby enabling the fraudster to sometimes accumulate vast amounts of data before being detected.

Because the fraudulent acquisition of data, such as by the use of malicious software, may occur over a period of time (say weeks or even months), it may be difficult for card issuers to identify when and where a breach or compromise occurred.

Financial institutions have used various approaches to identify a location and time where data may be been compromised. For example, when fraudulent transactions against credit or debit cards are reported, card transactions may be cross checked to identify any retailer or merchant where the cards may have been used in common (a common point-of-purchase). If a meaningful number of fraudulent transactions can all be back traced to a common point-of-purchase, then a financial institution analyzing transaction data can assume that any other account data collected by the merchant at the common point-of-purchase during the same time has likewise been compromised, and can take steps to scrutinize the identified accounts for fraudulent activity, and perhaps close the accounts or reissue account cards.

However, identifying a common point-of-purchase can be difficult, especially when fraudulent transactions are conducted against the compromised accounts in patterns that are difficult to analyze. For example, an entity that has hacked into a retailer system and acquired account data relating to large numbers of accounts across many financial institutions, may "package" the stolen data for subsequent use in ways that make detection difficult. The stolen account data for one financial institution may be sold to a first entity that uses it immediately for fraudulent transactions, and then later in time, account data for a different financial institution may be sold to a second entity. Only one financial institution may be initially aware of the breach, since not all the stolen card data is being used fraudulently at the same time. In other instances, an entity that has hacked into a retailer system may "package" the stolen data according to its value. For example, debit cards and credit cards with lower credit limits may be less valuable and may be sold to one entity, and premium credit cards with higher credit limits may be sold at a different time (and at a higher price) to another entity. With perhaps only portions of the stolen data being used when fraudulent transactions are first detected, back tracing transactions to find a common point-of-purchase can be difficult, leading to extensive losses by financial institutions until the likely location and time of breach has been identified.

Adding to the difficulty in back tracing is the common occurrence of groups of cards being used for authorized transactions at two close merchant locations at nearly the same time. If two merchant locations are located close to each other, many customers visiting one merchant location may immediately thereafter visit the other merchant nearby (e.g., at a multi-merchant retail center, a customer shopping at one merchant may also shop at another merchant next door). If there has been a suspected breach, it may be difficult to know which of the two merchants has given rise to the suspected breached.

Further, once a potential breach has been identified, large numbers of accounts or credit cards may be potentially implicated and a financial institution may be forced into monitoring all those accounts, even those accounts at lower risk for fraudulent transactions. In some cases, the results of the analysis leading to the common point-of-purchase can be ambiguous, and may indicate (either correctly or not) that there may be more than one potential compromised system. This can make it difficult for a financial institution to properly address a potential breach of data pertaining to its accounts, and can lead to needless expense in trying to contain the risk.

BRIEF SUMMARY OF THE INVENTION

According to one aspect, a merchant transaction system comprises a processor and memory. The memory holds data and instructions, and the instructions, when executed by the processor, cause the system to receive a transaction request from a customer for a card-not-present sale transaction. The sale transaction request contains information including number of an account being used in the sale transaction and other information. The instructions further cause the system to transmit over an electronic network a transaction risk request message to a transaction risk evaluator, and to receive over the electronic network a reply message from the transaction risk evaluator. The reply message indicates a level of risk associated with the sale transaction. The instructions further cause the system to decide whether to proceed with the card-not-present sale transaction based at least in part on the content of the reply message.

A more complete understanding of the present invention may be derived by referring to the detailed description of the invention and to the claims, when considered in connection with the Figures.

BRIEF DESCRIPTION OF THE DRAWINGS

FIG. 4 illustrates data collected for a merchant where cards having fraudulent transactions have been used, the data organized into a back trace window in order to identify a merchant suspected of having a potential breach and to generate corresponding merchant risk scores.

FIG. 8 illustrates a checkout screen on which a customer may enter information, in accordance with embodiments of the invention.

FIG. 10 illustrates an example format of a request message that may be sent from a merchant to a transaction risk evaluator in accordance with embodiments of the invention.

FIG. 11 illustrates an example format of a response message that may be sent from a transaction risk evaluator to a merchant in embodiments of the invention.

DETAILED DESCRIPTION OF THE INVENTION

Figure 1:
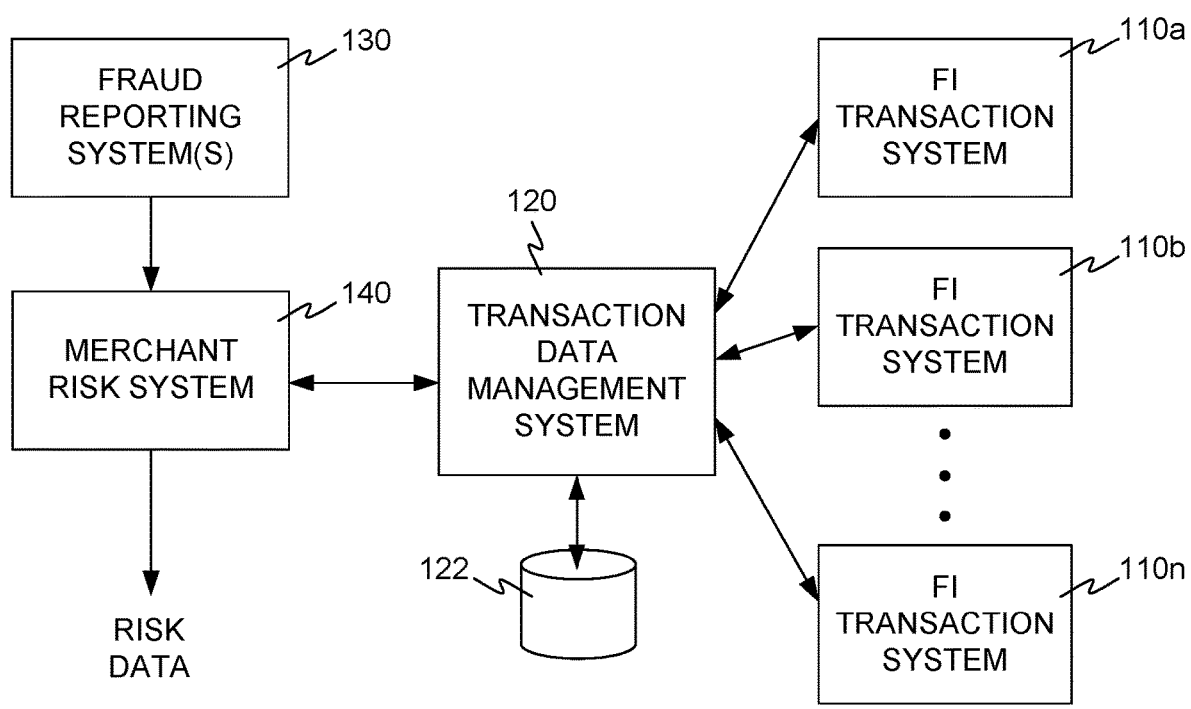
FIG. 1 is a general block diagram illustrating a network in which a plurality of account-holding institutions contribute data that is used to identify merchants suspected of having compromised customer account data.

There are various embodiments and configurations for implementing the present invention. Generally, disclosed embodiments provide computerized systems and methods for identifying risk associated with card purchases. In some embodiments, a merchant that has had a suspected/potential breach of data is identified, based on spikes in fraudulent transactions (for cards used at that merchant). In other embodiments, merchant risk scores are developed for a merchant location that may have been breached, and suspect merchants are identified based on the merchant risk scores. In yet other embodiments, an account risk score may also be developed for accounts that may have been breached at the merchant location.

In one embodiment, a method and system for scoring risk uses transaction data contributed by a plurality of financial institutions, such as banks, that maintain accounts and issue credit, debit or other types of cards. The use of transaction data from more than one financial institution improves the accuracy and timeliness in identifying a breach of data, such as at a retailer/merchant system. The transaction data is back traced to identify common points-of-purchase for cards having fraudulent transactions. Merchants having a system breach may be identified based on spikes in fraudulent activity. Additionally, merchants having a system breach may be identified based on calculated merchant risk scores. In some embodiments, a card issuer (financial institution) may receive risk scores for multiple merchants (each representing a specified level of risk associated with one of the merchants), thus permitting the card issuer to scrutinize transactions conducted against accounts where the risk resulting from a breach or compromise may be, at least initially, ambiguous and the specific merchant involved may be difficult to definitively identify. In some embodiments, a financial institution may also receive both a merchant risk score (reflecting a risk that card data used in transactions conducted at a merchant may have been compromised) and an account risk score (reflecting a risk that an account, if breached, may be used for a fraudulent transaction).

In described embodiments, suspected merchants having a potential/suspected breach are identified (and merchant risk scores generated) based on transaction data that is organized around a back trace window (e.g., the back trace window may include a preceding 180 day period over which the transaction data is collected). Among other things, the data in the window reflects, for a specified merchant, whether there has been a fraudulent transaction reported for a card (a "claim") on a given day (a claim date), if that card has been previously used at the specified merchant at any time during the back trace window (e.g., the preceding 180 day period). Thus, for purposes of constructing the back trace window, a "claim" is a card for which a fraudulent transaction is reported, and a "claim date" is the day that the fraudulent transaction is reported. The data in the window also reflects the total number of cards having reported fraudulent transaction (claims) reported that same day (on the claim date), if those cards were used at that same merchant at any time during the back trace window. The data in the window may further reflect, for purposes of calculating a risk score for a given merchant, a value representing the minimum or lowest number of different merchants at which any of those cards (with fraudulent transactions) have been used (such value referred to as a Minimum Exposed Risk Card or MERC value). As will be fully explained later, a smaller MERC value reflects a smaller number of merchants where a breach may have occurred, and thus a merchant involved in claims giving rise to a smaller MERC value (such as the merchant for which the back trace window was created) has a higher risk of being the source of the breach.

In one described embodiment, a suspect merchant may be identified when there is a single day spike in claims against cards used at the same merchant. Further, a suspect merchant may additionally be identified based on a calculated risk score for that merchant (where the MERC score is used to calculate the risk score).

A compromise period of time (reflecting a likely period of time during which the compromise or hacking has occurred) may be defined by a compromise start date and a compromise end date. The compromise start date can be based on a period of time in which a predetermined large majority of the fraudulent transactions back traced to the merchant have occurred (say, 90%, where it is determined that, for a given start date, 90% of the claims back traced to the identified merchant occurred after that start date). A compromise end date can be viewed as ongoing (not yet established), unless a predetermined large majority (say, 95%) of claims back traced to the identified merchant occurred prior to a given end date, in which case that given end date is the compromise end date.

While described embodiments refer to identifying suspect merchants and providing merchant risk scores in connection with fraudulent credit/debit card transactions, it should be appreciated that the invention has application to transactions involving other types of accounts as well, such as (but not limited to) checking accounts, savings accounts, stored value accounts, gift card accounts, and loyalty accounts. Further, while the described embodiments also refer to account data breaches occurring at merchant systems storing customer data, it should likewise be appreciated that other types of breaches are contemplated, such as breaches of devices (such as ATMs and point-of-sale devices), as well as other data systems that collect and/or store various kinds of account or personal information for any type of business or entity, such as (but not limited to) banks and other financial institutions, health insurance companies, hospitals, utility companies, charitable organizations, and government agencies.

One embodiment for implementing the present invention is shown in FIG. 1, where a plurality of financial institutions having transaction systems 110a-110n, are connected for providing transaction data to a central transaction data management system 120. The financial institutions maintaining the systems 110a-110n may receive transaction data from acquirers or other transaction processing systems that process credit card and debit card transactions from various merchants (not shown). In some cases, the transaction data may be provided to the transaction data management system on behalf of the financial institution by acquirers and transaction processing systems/entities.

In the embodiment illustrated in FIG. 1, the financial institutions have collected transaction data (representing specific transactions conducted against accounts maintained at each financial institution) as part of authorizing and posting a transaction to the account against which it is conducted. The transaction data may include, for example, a transaction ID, an account number, merchant ID, transaction date, a transaction amount and other related transaction data, and may in turn be provided periodically (e.g., in batched form) to the transaction data management system 120. The transaction data management system 120 has an associated database or data store system 122 that stores the transaction data provided by the plurality of systems 110a-110n, with such data then accessed and analyzed in a manner to be described shortly in order to identify merchant or retailer systems that may have been compromised, such as by a malicious software program installed in one of the retailer systems.

Also seen in FIG. 1 is a fraud reporting system 130, which may represent one or more systems maintained by various institutions for reporting fraudulent or likely-fraudulent transactions. The fraud reporting system may be resident at one of the financial institutions operating the systems 110a-110n, or resident at a different financial institution. In some cases, the fraud reporting system may be operated by a third party, such as an acquirer or transaction processing entity, on behalf of a financial institution. When a fraudulent transaction is reported by the system 130, the transaction is identified and reported to a merchant risk system 140. As will be more fully described later, a reported fraudulent transaction may be analyzed in conjunction with other transactions stored at transaction data management system 120/database system 122 by the merchant risk system 140. The merchant risk system 140 may identify suspect merchants, and then provide the identified suspect merchants and, in some embodiments, other risk data (such as merchant risk scores and account risk scores) to a card issuer (financial institution) that maintains any account that is believed to have been compromised (such as, but not necessarily, one of the financial institutions operating the transaction systems 110a-110n).

Figure 2:
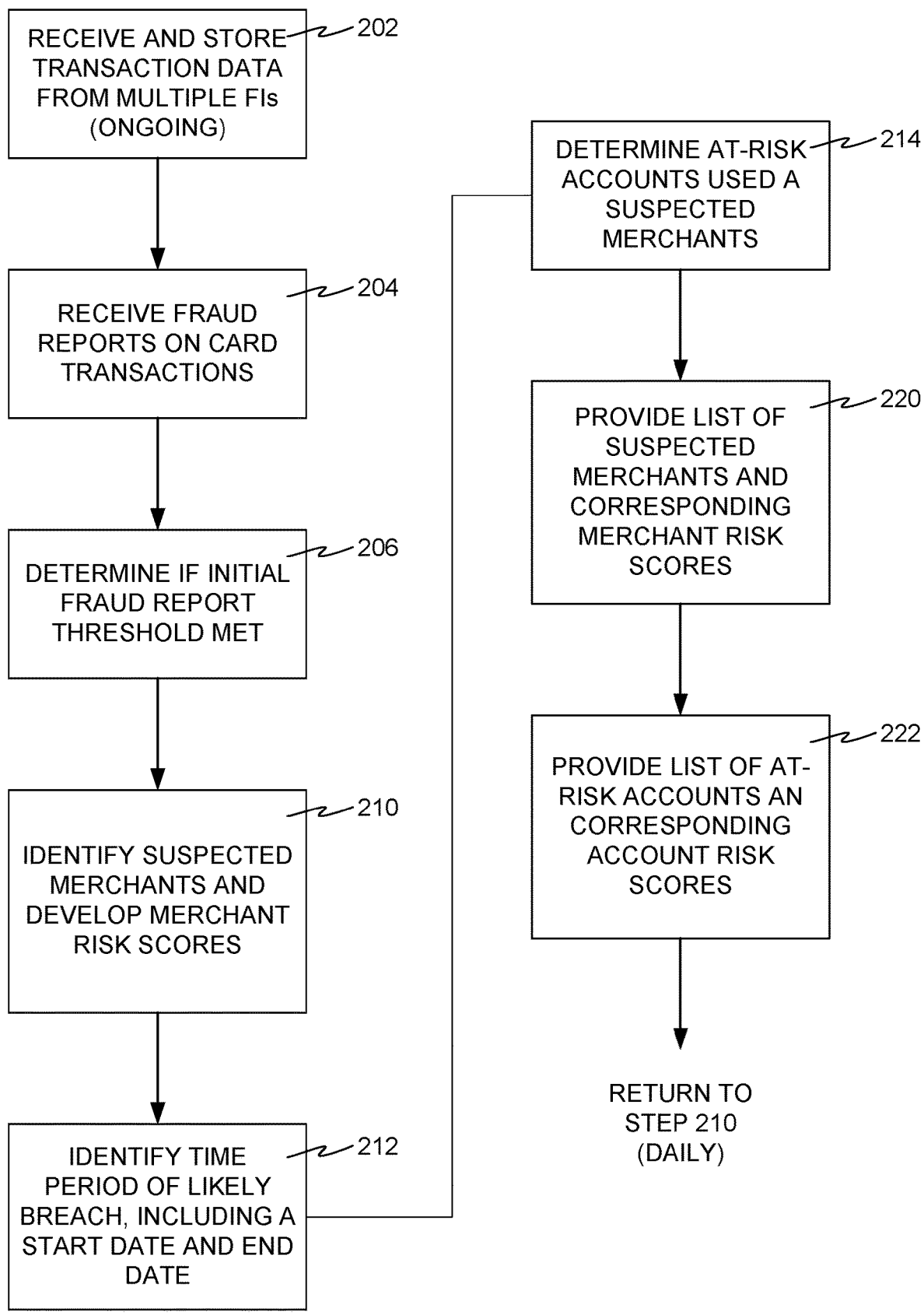
FIG. 2 is a flow diagram illustrating a general process for identifying a potential breach of a merchant system and providing risk scores corresponding to the merchant breach.

Turning now to FIG. 2, an overall process is illustrated for identifying a merchant whose systems may have been breached/compromised and providing the identified merchant and a risk score for that merchant (and an account risk score associated with each account that may been compromised) to an affected financial institution.

Initially in this process, transaction data from multiple financial institutions (such as data from transaction systems 110a-110n) are received at the transaction data management system 120 and stored in the database system 122, at step 202. In disclosed embodiments, this data is received on an ongoing basis (e.g., daily, in batched form) so that transaction data can be evaluated continuously and information associated with suspect merchants and at-risk accounts frequently updated and provided to financial institutions for monitoring. Fraud reports (e.g., from fraud reporting system 130) are likewise received on an ongoing basis at step 204 and are used, in a manner to be described shortly, to initiate steps for identifying merchants who are suspected as having had their systems and data compromised. Fraud reports identify specific transactions that are (or likely to be) fraudulent or unauthorized. The transactions may be identified by transaction ID or other identifying data, such as account ID, merchant ID, transaction date and transaction amount associated with a suspected transaction.

At step 206, the merchant risk system 140 evaluates reported fraudulent transactions received at step 204 and determines whether the level of fraudulent transactions has reached an initial threshold before proceeding further. This can be accomplished in a number of ways, such as by monitoring the overall number of fraudulent transactions each day. As examples only, the threshold can be based on the total number of fraudulent transactions reported each day, the total number of fraudulent transactions reported against any one issuer each day, or the total number of fraudulent transactions made against any one account each day. If the threshold has been reached at step 206, then merchant risk system 140 identifies suspected merchants and calculates a risk score for at least some of the suspected merchants (based on the fraudulent transactions reported for cards used at those merchants), step 210. As will be described in greater detail later, the merchant risk system 140 may, in some embodiments, provide a list of multiple merchants and their corresponding risk scores (merchant risk data) so that a card issuer (financial institution) can periodically evaluate the merchant risk data, for example, on a daily basis, to observe trends in the merchant data. By receiving, when necessary, identification of multiple merchants (and, in some cases, merchant risk scores), the card issuer is in a better position to act on suspected data early on, when initial analysis may involve ambiguous or uncertain data (arising, for example, because of the way that stolen account data may be packaged and used by fraudsters, as described earlier). Thus, a card issuer receiving risk data may begin steps to notify a specific merchant that it may have been breached (and begin to carefully scrutinize transactions conducted against at-risk accounts affected by the breach) when it observes that a specific merchant risk score begins to increase over a period of time. At step 212, the risk system 140 also identifies a suspected time period during which a potential breach may have occurred.

Identifying a possible compromise period of time can be based on the distribution of fraudulent transactions over time. In one embodiment (briefly mentioned earlier), the merchant risk system 140 may calculate a likely compromise start date and a likely compromise end date, each based on the period during which the vast majority of fraudulent transactions (made against cards used at a suspect merchant) have occurred. For example, after the dates of all fraudulent transactions are identified, a likely start date may the date after which, say 90%, of the reported fraudulent transactions occurred, and the likely end date may be the date before which, say 95%, all of the reported fraudulent transactions occurred. Larger or smaller percentages could be chosen. It should be noted that, if large numbers of fraudulent transactions are continuing to occur each day during this process, the breach might be determined as still ongoing (without a current end date).

At step 214, the system 140 identifies at-risk accounts that have been used at a suspected merchant. This can be done by evaluating any card accounts that were used at the suspect merchant during a period of time when a breach may have occurred. As will be more fully described later, each at-risk account may also be separately evaluated at step 214 for an account risk score, based on various factors to be described later.

At step 220, a list of suspected merchants and merchant risk scores (for at least some of the suspected merchants) are provided to a card issuer. It should be noted that the card issuer receiving risk scores at step 220 may or may not be the financial institution that maintains an account whose data may have been breached. This is done, for example, because breached data may be used by fraudsters in sophisticated ways to conceal the breach, such as by using (at least initially) only account data pertaining to specific card issuers or types of cards. As a result, initial fraud reports and risk scores may not reflect the entire scope of the breach (e.g., an issuer may be at risk, but its accounts have not yet been used for fraudulent transactions) and, as noted earlier, as identified merchants and risk scores are adjusted and change over time, a card issuer can decide to act on a suspected breach as the risk data and risk scores evolve and reach a threshold that the issuer finds as indicating a likely data compromise/breach.

At step 222, the risk system 140 provides a list of at-risk accounts and corresponding account risk scores that may have been previously generated at step 214. As illustrated in FIG. 2, the process then returns to step 210, reflecting that the illustrated process is performed continuously, e.g., on a daily basis, and that the data provided at step 220 (suspect merchants and scores) and at step 222 (at-risk accounts and scores) is updated and reported to financial institutions as new suspected merchants are identified (or previously identified merchant drop off the list), and as risk scores change.

Figure 3:
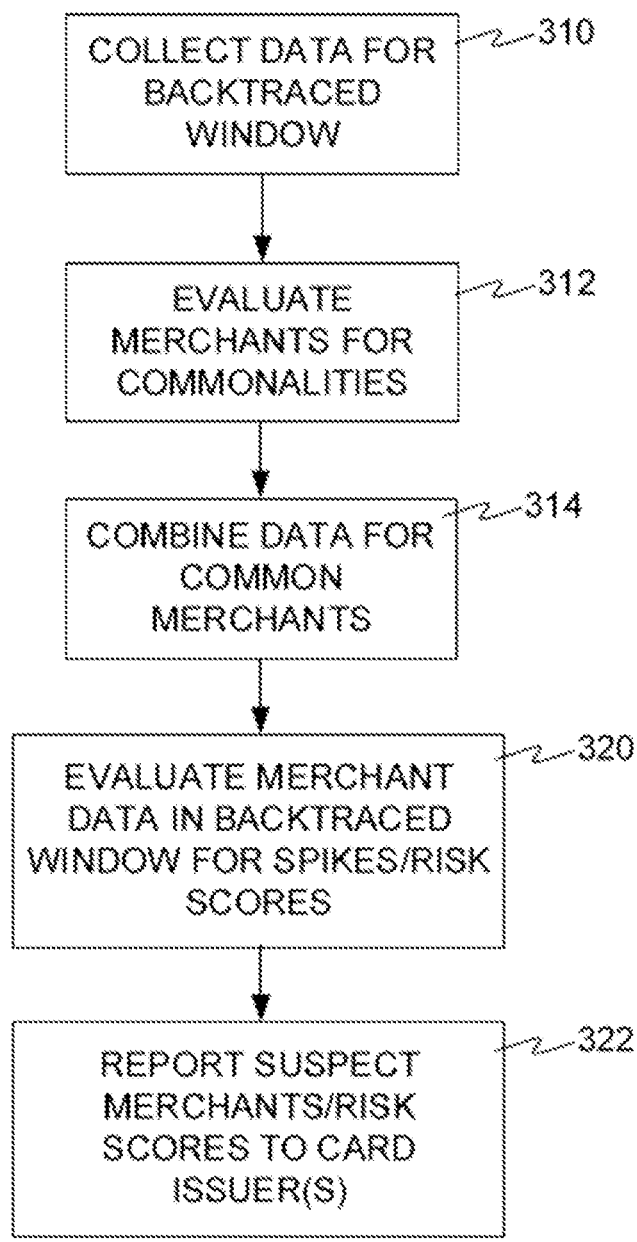
FIG. 3 is a flow diagram illustrating an overall process for developing a list of merchants suspected as having compromised account data, and a merchant risk score for one or more of the suspect merchants.

Turning now to FIG. 3, a process is illustrated for identifying suspect merchants and providing merchant risk scores. At step 310, the merchant risk system 140 collects and develops risk data for a back trace window, in response to receiving fraud reports at an initial threshold level indicating a possible data breach (step 206, FIG. 2). An example of data collected for a back trace window is illustrated in FIG. 4 and includes, for a single merchant (as identified by one merchant ID), each fraudulent transaction against a card where that card has been back traced to (previously used at) the merchant. In this embodiment, the data is collected for a window encompassing all transactions over a period of 180 days prior to the first day of data evaluation. The data seen in FIG. 4 relates to only one merchant where a card having a fraudulent transaction has been used, and there would be similar data for each other merchant where the card having a fraudulent transaction has been used.

In the specific back tracing example seen in FIG. 4, for a single merchant (Merchant ID "8788430112639"), back tracing has begun on "Day 1" and on that date (Dec. 14, 2013) there has been a reported claim (a card having a reported fraudulent transaction, where that same card has been used at the identified merchant within the preceding 180 day window). The number of claims reported on Day 1 is "2," i.e., there are two cards having reported fraudulent transactions on the claim date (Dec. 13, 2004) which were used at the merchant during the preceding 180 day window. For those two cards, the card used at the smallest number of merchants during the 180 day window was used at 66 merchants (thus providing a MERC value of 66). As illustrated, once the back tracing of data has begun (step 310 in FIG. 3), the back tracing continues every day thereafter. In FIG. 4, each of Day 2 through Day 19 has no reported claims, and thus no claim data for those days is shown in the back tracing window. At "Day 20" (Dec. 23, 2013), a claim is reported, the total number of claims that day is "1," and the MERC score (for that one card) is 58. The data illustrated in FIG. 4 is illustrated through Day 84 (Feb. 26, 2014), although the actual back tracing of data may continue thereafter (back tracing would typically continue until a breach has been confirmed, or it is determined that the merchant in question is no longer suspect).

Returning to FIG. 3, the merchants that are reflected in all of the back trace windows (FIG. 4 representing only one such window for one merchant) are then evaluated to identify commonalities in the merchants, step 312. This is done because the merchant ID used in a back trace window may represent a single merchant location that is part of a larger merchant entity. A breach may have occurred at a system at the single merchant location or at a system operated by the larger merchant entity (the latter may result in transactions that can be back traced to multiple merchant locations operated by the larger merchant entity). The merchant risk system 140 will evaluate both single merchant locations and any identified larger merchant entity to determine whether a breach may have occurred at a single merchant location or at a system operated by the larger merchant entity.

As an example, at step 312, commonalities may be recognized by looking at the merchant names associated with merchant IDs (merchant names for multiple merchant IDs may all have a common name or name component, reflecting that they are part of a larger merchant entity). Other data may also be evaluated, such as evaluating common MCCs (merchant classification codes), common acquirers, and common terms in company descriptions (e.g., "pizza" merchants). At step 314, merchant IDs that are found to likely be part of a larger merchant entity are combined, so that when back trace window data is subsequently evaluated to identify suspect merchants, it may be evaluated both at a single merchant location level (associated with one merchant ID) and at a larger merchant entity level (associated with combined merchant IDs, where all the back traced data is combined and evaluated together for the larger entity). It should be appreciated that in some cases a single merchant ID may have been assigned to a corporate or larger merchant entity, and that evaluation of that single merchant ID may encompass all transactions performed across all locations of that larger merchant entity.

At step 320, each back trace window is evaluated for spikes in claim activity or for calculation of merchant risk scores (or both), in order to identify a merchant that has had a potential system breach.

A process by which back trace window data is evaluated (including the recognition of "spikes" in claims) will be described in greater detail later in conjunction with FIG. 5. Briefly, referring to the specific back trace example seen in FIG. 4, the risk scoring system 140 is designed to identify a spike in cards having fraudulent transactions (claims) on one date and that can all be back traced to one merchant. In one exemplary embodiment, the spike may be defined by the number of claims on a claim date that meets both of the following requirements:

(1) the number of claims is greater than 10 (CLAIMS>10) and (2) the number of claims is greater than the sum of 3 times σ and Avg (CLAIMS>(3σ+Avg)), where "σ" is the standard deviation of claims for all merchants over the previous 30 days and "Avg" is the average daily number of claims for all merchants over the previous 30 days.

In the back trace window example in FIG. 4, the claim activity associated with Backtracing Day 79 (referenced by arrow 410) represents a spike in claim activity that meets the above two requirements.

Simultaneously, and as will be further described in connection with FIG. 5 below, each merchant's back trace window is evaluated for a predetermined number of accumulated claims (e.g., 15 or more claims over the previous 30 days) and if there is such number of accumulated claims, a risk score for each such merchant is also calculated at step 322. In the example seen in FIG. 4, the merchant scores would be calculated for the identified merchant beginning on Day 80 (and continuing daily thereafter until the breach is confirmed, or the merchant is no longer suspect).

Finally, for any day where a spike in claim activity is determined or a merchant risk score is calculated (above a threshold value), the merchant associated with that spike or risk score is reported to a card issuer or financial institution, step 322. As will be described shortly, the report to a card issuer may include multiple merchants that each have experienced a spike in claims or have a reportable risk score.

Figure 5:
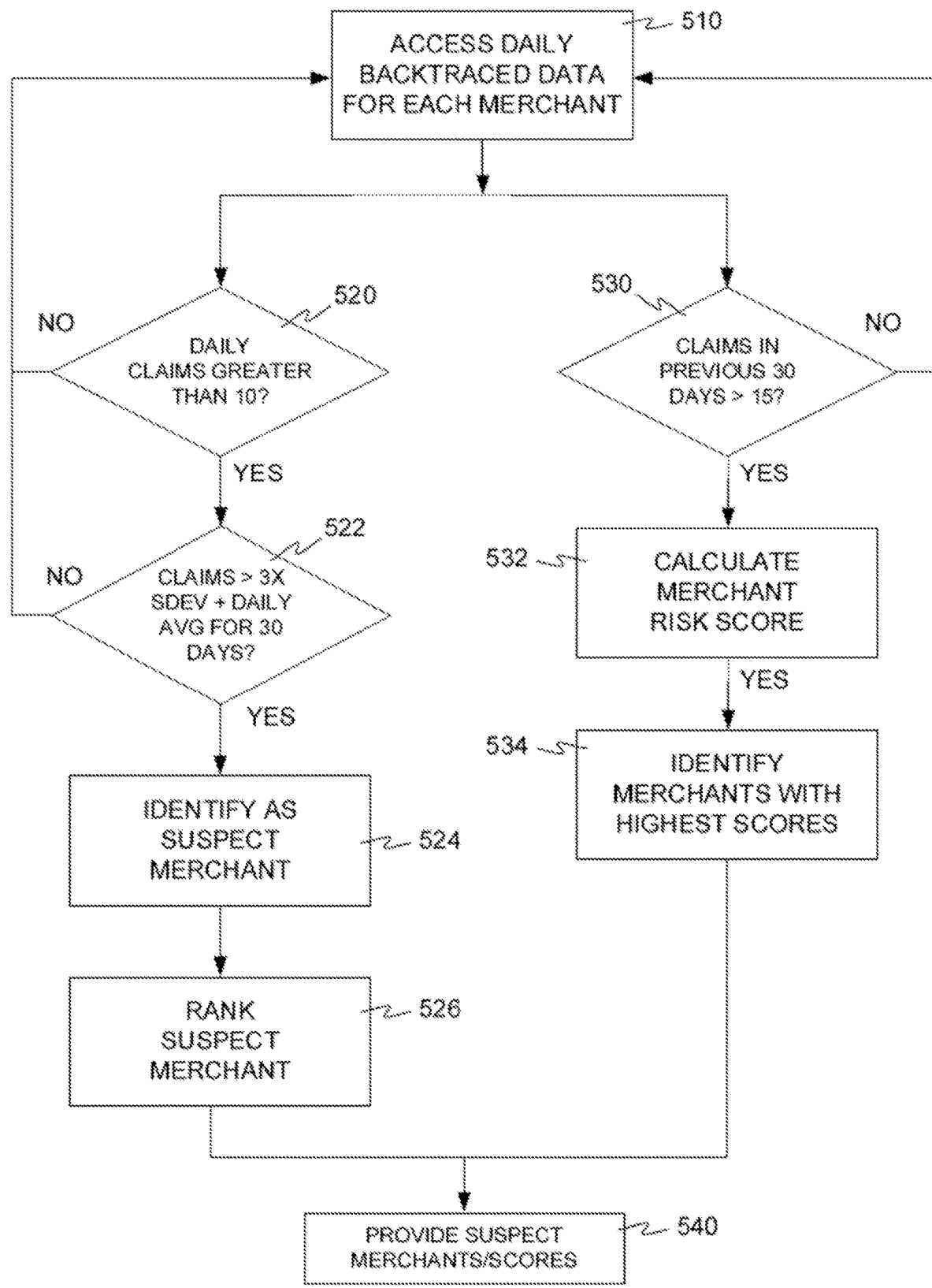
FIG. 5 is a flow diagram illustrating a specific process for identifying suspected merchants based on either spikes in fraudulent transactions or merchant risk scores.

Turning now to FIG. 5, a more detailed process is illustrated for identifying a merchant as suspect (and providing risk scores associated with at least some suspect merchants). At step 510, the daily back traced data for each merchant is accessed (such as the data represented during any one of the back traced days seen in FIG. 4). In the presently described embodiment, there are two methods for identifying suspect merchants as a result of accessing data at step 510, one method illustrated generally on the left side of FIG. 5 (steps 520-526) and the other method illustrated generally on the right side of FIG. 5 (steps 530-534). As to the method illustrated on the left-hand side of FIG. 5, the merchant risk system 140 first determines if the number of claims on the back tracing day is greater than 10, step 520. If it is not, then the process returns to step 510 and waits until the next day to again access back traced data (e.g., data collected over a 180 day period preceding that next day). As should be appreciated from FIG. 4, the return to step 510 (if there are not greater than 10 claims at step 520) is repeated each day. For the specific merchant whose data is illustrated in FIG. 4, at Day 79 (Feb. 21, 2014) there are now claims greater than 10, and at that time the process would continue to step 522.

At step 522, the merchant risk system 140 determines whether the number of claims is greater than the sum of three times the standard deviation (for daily claims over the previous 30 days for all merchants) and the daily average of claims (over the previous 30 days for all merchants). If the number of claims on a given date is less than or equal to the sum represented at step 522, then the process returns to step 510. On the other hand, if the number of claims on a given date is greater than the sum represented at step 522, then a spike in claims is determined to be present for that day. Thus, the following formula (briefly mentioned in conjunction with FIG. 3) is used at step 522:

$$CLAIMS > (3\sigma + Avg)$$

In the example seen in FIG. 4, on Day 79 the following values are present:

Avg=3 (the average daily number of claims for all merchants for which back trace data has been collected and then accessed at step 510).

σ=1.5 (the standard deviation is well known statistical computation based on a given population and is usually computed as the square root of the variation of the population from the mean or average). In this example, a standard deviation of 1.5 means that most merchants over the previous 30 days will have total claims within 1.5 of the mean or average of 3 daily claims).

Thus, the number of claims (47) for the identified merchant (FIG. 4) for Day 79 is greater than 3×1.5+3 or 7.5, and a spike in claims for that merchant is determined to exist and the merchant is identified as a suspect merchant at step 524. Steps 510 through 524 are determined across all merchants having back traced data windows, and all of those merchants are ranked (as will be described shortly).

A ranking of merchants is performed at step 526. In one embodiment, the ranking is done with use of a "Z-score." A Z-score is particularly useful way of measuring the risk associated with aggregated data, such as fraudulent transactions. In particular, a Z-score is a statistical measure of how much a value is above or below a mean or average in a given population (more specifically, how many standard deviations the value is above or below the mean). A Z-score is calculated using the following formula:

$$Z = \chi - \mu / \sigma$$

where χ is the value to be standardized (the number of claims on the date in question for a given merchant), where μ is the mean of the population (e.g., the average number of claims for all merchants on the given date, considering data collected over the previous 30 days), and where σ is the standard deviation of the claims for all merchants on the given date (e.g., considering data collected over the previous 30 days).

In the particular example just given for Day 79 (FIG. 4), there have been 47 reported claims (χ), the mean (μ) for reported fraud complaints for all merchants is 3, and the standard deviation (σ) for all merchants is 1.5.

Thus, for this example, the Z-score for fraud complaints for the given merchant using the formula is:

$$Z = 47 - 3/1.5 = 29.33 \; 1.5$$

Thus, on Day 79, the merchant in question has a Z-score of 29.33 and such score is used in conjunction with the risk scores of other merchants on that day (that have claim spikes) to rank those merchants at step 526 (i.e., from highest Z-score to lowest Z-score).

Referring now to the method illustrated on the right-hand side of FIG. 5, and at about the same time as steps 520-526 are performed, the merchant risk system 140 first determines (step 530), for each merchant, whether the number of claims reported for that merchant over the previous 30 days is greater than 15. If not, the process returns to step 510 and waits until the next day to access the back traced data. If the number of claims in the previous 30 days is greater than 15 at step 530, then a merchant risk score calculated at step 532. The merchant risk score is calculated in accordance with the formula to be described below in conjunction with FIG. 6. After the merchant risk score is calculated, those merchants having the highest risk scores are identified at step 534. In one embodiment, of all merchants for whom merchant risk scores are calculated, those merchants having the 200 highest merchant risk scores are identified at step 534.

At step 540 the ranked merchants at step 526 and the highest scoring merchants at step 532 are provided to a card issuer as suspect. In some embodiments, the risk score for each of the merchants identified at step 534 is also provided to the card issuer.

Figure 6:
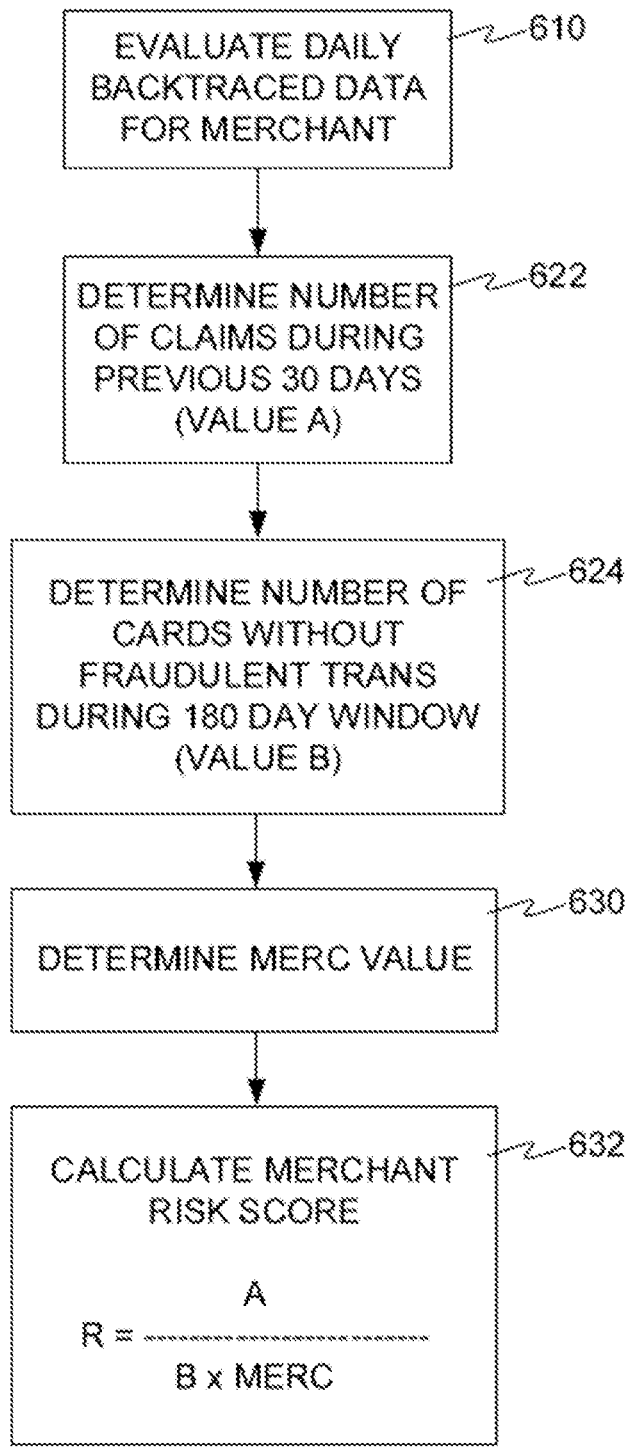
FIG. 6 is a flow diagram illustrating a specific process for calculating merchant risk scores based on MERC values.

Turning now to FIG. 6, there is illustrated a process for determining a merchant risk score, such as the merchant risk score referenced at step 532 in FIG. 5. At step 610, the daily back traced data for each merchant that is accessed by the merchant risk system 140 (step 510, FIG. 5) is evaluated. The merchant risk system 140 determines the number of claims for that merchant during the previous 30 days, step 622 (such determined number is identified as value "A"). Next, at step 624 the merchant risk system 140 determines the total number of cards (all cards used to develop the data in the back trace window) that have no fraudulent transactions during the 180 day back trace window (such determined number is identified as value "B").

At step 630 the merchant risk system determines the MERC value for the merchant on that day and at step 632 the merchant risk score R is calculated using the following formula:

$$R = A/B \times MERC$$

It should be appreciated, as seen in the above formula, that the merchant risk score R for any merchant will increase on any given day as the MERC value decreases. As mentioned earlier, this is due to an enhanced risk for a merchant when any card back traced to that merchant has been used at a relatively small number other merchants. Thus, for example, if a card has been used at very few other merchants, it is more likely that the breach occurred at the merchant in question. If the card has been used at many other merchants, then the probability of the breach having occurred at the merchant in question is less likely.

As mentioned earlier in conjunction with FIG. 2, in some embodiments a card issuer that receives reports on suspect merchants and merchant risk scores might also receive risk scores associated with specific accounts that appear to have been compromised (accounts used for transactions at the suspect merchant during the compromise period). This can be accomplished in a number of different ways using different factors, as described below.

Fraudster Website—Websites are monitored where stolen card numbers are sold to third parties (for subsequent use in conducting fraudulent transactions). When stolen card numbers appear for sale, and then are removed, such card numbers removed are likely to be used shortly thereafter and are deemed to be at higher risk.

Type of Card—As mentioned earlier, certain types of cards have higher value for fraudulent transactions and are thus deemed to be at higher risk (e.g., a debit card has lower risk, a standard credit card has higher risk, and a premium credit card has highest risk; credit cards with higher credit limits have greater risk than credit cards with lower credit limits).

Past experience with issuer's cards—some card issuers identify fraudulent transactions more slowly than others, and cards issued by such issuers are at a higher risk.

ZIP Code of the merchant location—The ZIP code of the merchant location where the card was stolen can have a bearing on risk. For example, third parties purchasing stolen card data may be known to operate in certain areas, and cards compromised in those areas may be at higher risk (e.g., a card issuer is less likely to spot a fraudulent transaction in a location where a cardholder regularly uses the card, and is more likely to spot a fraudulent transaction in an area distant from where the cardholder regularly uses the card). Thus, when a fraudster known to operate in a certain area, and a card has been stolen that is regularly used in that area, such a card is deemed to be at a higher risk.

The merchant risk system 140 may assign a numerical value to each of the above risk factors (and others), such as on a scale from 0 to 100. Different risk factors may be weighted differently, depending on the experiences or desires of a card issuer or the entity operating the merchant risk system 140. The risk factors are combined to develop a normalized overall risk score (say, from 0 to 100) for each card/account number. Such overall risk score for each compromised account is sent to the card issuer (e.g., at step 222, FIG. 2).

In the usual arrangement, a credit card issuer bears the risk of illicit transactions conducted when a physical card is present, for example when a consumer presents a physical credit card at a merchant point of sale. In such a transaction, the merchant can proceed without risk of non-payment by the issuer.

However, in a card-not-present (CNP) transaction, for example a transaction conducted over the Internet with an online merchant, the allocation of risk is reversed. The merchant bears the risk that a transaction is fraudulent and will go unpaid. As such, online merchants may have a strong interest in improved systems and methods for identifying potentially illicit transactions such as illicit sale transactions before they are completed.

Figure 7:
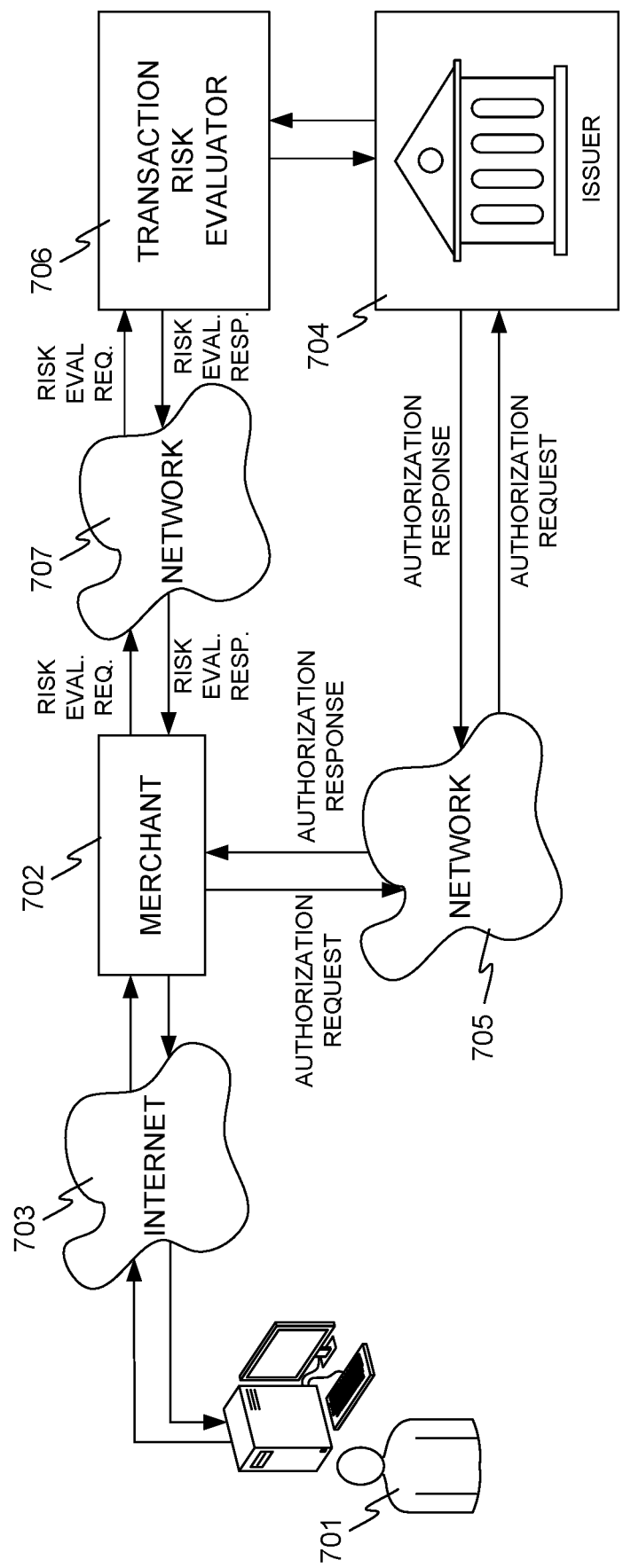
FIG. 7 illustrates various information flows and relationships between several parties that may be involved by embodiments of the invention.

FIG. 7 illustrates various information flows and relationships between several parties that may be involved by embodiments of the invention. A consumer 701 wishes to make a purchase from a merchant 702 in a card-not-present transaction. (From the point of view of the merchant, this kind of transaction is a "sale transaction", and will be referred to as such in this disclosure.) For example, consumer 701 may browse a website operated by merchant 702 via the Internet 703, and select items to buy, placing them in a "shopping cart" before proceeding to a "check out" screen.

At the checkout screen, consumer 701 may enter card information, as is shown in FIG. 8. Preferably, consumer 701 enters at least a card account number, a billing address, and a shipping address. Other information may also be collected, for example the email address of consumer 701, the phone number of consumer 701, or other information.

Referring again to FIG. 7, merchant 702 forwards the card information to issuer 704 via an electronic processing network 705, for approval of the transaction. Card issuer 704 compares the amount of the transaction with the available credit on the card account being used by the consumer (or available deposits if the account is a debit account), and returns a reply message indicating approval or denial of the transaction. If card issuer 704 denies the transaction, merchant 702 can decline to proceed with the transaction.

However, even if card issuer 704 sends an approval message, merchant 702 may wish for additional information about the trustworthiness of the sale transaction. Because the transaction is a card-not-present (CNP) transaction conducted over the Internet 703, merchant 702 may wish to take additional steps to learn if the transaction carries undue risk to the merchant. In addition to contacting card issuer 704 as described above, merchant 702 also sends a request message to a transaction risk evaluator 706 via electronic network 707. The request message includes some or all of the information entered by consumer 701, and preferably at least the number of the account being used in the sale transaction.

While the example arrangement of FIG. 7 shows merchant 702 in direct communication with risk evaluator 706, the invention is not so limited. In other embodiments a request message originating from merchant 702 may be sent to transaction risk evaluator 706 by an intermediary, for example at the behest of merchant 702 or as a contactor to merchant 702.

Risk evaluator 706 maintains one or more databases containing transaction information for a number of accounts held at a number of issuing institutions, and containing information indicating past actual or suspected illicit activity (e.g. fraud relating to at least some of the accounts. For example, the one or more databases may include a list of card account numbers previously used at a point of purchase in common with one or more other card accounts reported to have been used fraudulently. This common point of purchase (CPP) determination may be made by the techniques described in application 62/174,432, previously incorporated by reference. If the card account being used in the transaction of FIG. 7 appears on such a list, then there is some likelihood that the account has been compromised, even if it has not been reported as having been used for fraud or other illicit activity. Thus, the risk of the particular transaction being investigated is greater than if the card account did not appear on the CPP list.

Because risk evaluator 706 preferably collects account information from a number of different card issuers, risk evaluator 706 may be able to discover fraud potentialities that would not be apparent to a single card issuer such as issuer 704. For example, issuer 704 may not be able to discover on its own that one of its accounts was used at a common point of purchase with an account from a different issuer later used illicitly.

Risk evaluator 706 may perform other kinds of analyses as well. In some embodiments, risk evaluator 706 may review the customer-entered information for correlations with past instances of actual or suspected illicit activity. For example, transaction risk evaluator 706 may search its databases for any indications that the billing or shipping addresses supplied by the customer were previously used in a fraudulent transaction. Similarly, the customer-entered email address or telephone number may be investigate for association with any previous fraud. Many other analyses are possible, and some are described in more detail below.

Transaction risk evaluator 706 prepares a response message based on any identified correlations, and associated with a level of risk associated with the transaction. The reply message is made available to merchant 702. For example, the response message may be transmitted directly from transaction risk evaluator 706 to merchant 702, or may be passed through an intermediary. Other methods of message delivery may be used as well.

In some embodiments, the response message may directly indicate the level of risk of the transaction as evaluated by transaction risk evaluator 706. For example, the response message may include a risk score. In other embodiments, the response message may not include a specific risk rating, but may contain information from which merchant 702 may perform its own risk evaluation. For example, the response message may include indications of whether the account being used in the transaction or any associated data (address, phone number, email address, etc) has previously been associated with fraud, or may indicate whether the account was used at a common point of purchase with other accounts reported to have been used fraudulently.

Preferably, the response message is sent in real time. That is, the response message is sent quickly enough that the merchant can use the information in the response message to decide whether to accept or decline the transaction during the "checkout" or a similar phase of the transaction. In some embodiments, transaction risk evaluator 706 can respond to a merchant request message within 1, 2, 3, 4, 5, 8, 10, 20, 30, 45, 60, 120, or another number of seconds after receiving the merchant request message. In other embodiments, the response message may not be sent in real time.

The indication of the level of risk may be presented in any of a number of ways. For example, the response message may include a transaction risk score that quantifies the cumulative risks uncovered in the analyses of the account information and other customer-supplied information. The response message may include a recommendation that the transaction be approved or denied. The response message may include supporting information, such as a number of items of information that contributed to the transaction risk score.

Upon receiving the response message, merchant 702 can decide whether to proceed with the sale transaction, to decline the sale transaction, or to take further steps to evaluate the risk of the sale transaction. For example, the merchant may require that the customer present a credit or debit card to support the sale transaction rather than conduct a card-not-present transaction, in order to shift the risk of non-payment to the card issuer. In some cases, the merchant may decide to decline the transaction based on the response message from risk evaluator 706, even though card issuer 704 may have approved the transaction. As such, the response message may be considered approval guidance for the merchant, because the information in the response message may inform the merchant's decision whether to proceed with the sale transaction or not.

Preferably, merchant 702 provides information to risk evaluator 706 as well. For example, merchant 702 may provide information to risk evaluator 706 about instances of fraud detected by merchant 702, so that the information can be incorporated into the databases maintained by transaction risk evaluator and used in future transaction risk analyses. For example, merchant 702 may provide card account numbers, billing addresses, shipping addresses, and other information associated with transactions that merchant 702 has determined to be fraudulent. In other embodiments, merchant 702 may provide the details of transactions that are not suspected of being illicit as well. Such transaction data may be provided on a batch basis if desired, rather than in real time.

Similarly, issuer 704 may provide to risk evaluator 706 information about instances of fraud of which issuer 704 may become aware. For example, issuer 704 may report to transaction risk evaluator 706 the account numbers of accounts reported to have been used illicitly, as well as the associated account holder names, billing and shipping addresses, phone numbers, email addresses, and the like. Risk evaluator 706 may use this information in future transaction risk determinations. For example, such information may assist transaction risk evaluator 706 in backtracing transaction data to determine the likely common point of purchase at which a data breach may have occurred, or may be used in other ways.

In addition, risk evaluator 706 may provide additional information to card issuer 704, for example lists of accounts that have been used at a point of purchase in common with other accounts that have been reported for fraud, or other information.

While only one merchant 702 and one card issuer 704 are depicted in FIG. 7 conducting a single transaction, it will be understood that preferably transaction risk evaluator 706 receives information from and exchanges information with many merchants and issuers, in order that transaction risk evaluator 706 can detect instances of suspected fraud that may not be apparent to any individual merchant or issuer. For example, the risk of a particular transaction may be elevated if the account being used in the transaction was used in a fraudulent transaction previously conducted at a different merchant. Similarly, the risk of a particular sale transaction may be elevated if the card account being used in the sale transaction was previously used at a common point of purchase with accounts reported as compromised by a different card issuer. Or the risk of a particular sale transaction may be elevated if the holder of the card account being used in the sale transaction has been previously associated with illicit activity. Or the risk of a particular sale transaction may be elevated if the shipping address given for the transaction matches the shipping address of multiple fraudulent transactions reported by a different merchant. Many other factors may be considered.

It is envisioned that in embodiments of the invention, an entity such as risk evaluator 706 may receive many thousands or even millions of merchant request messages daily.

Figure 9:
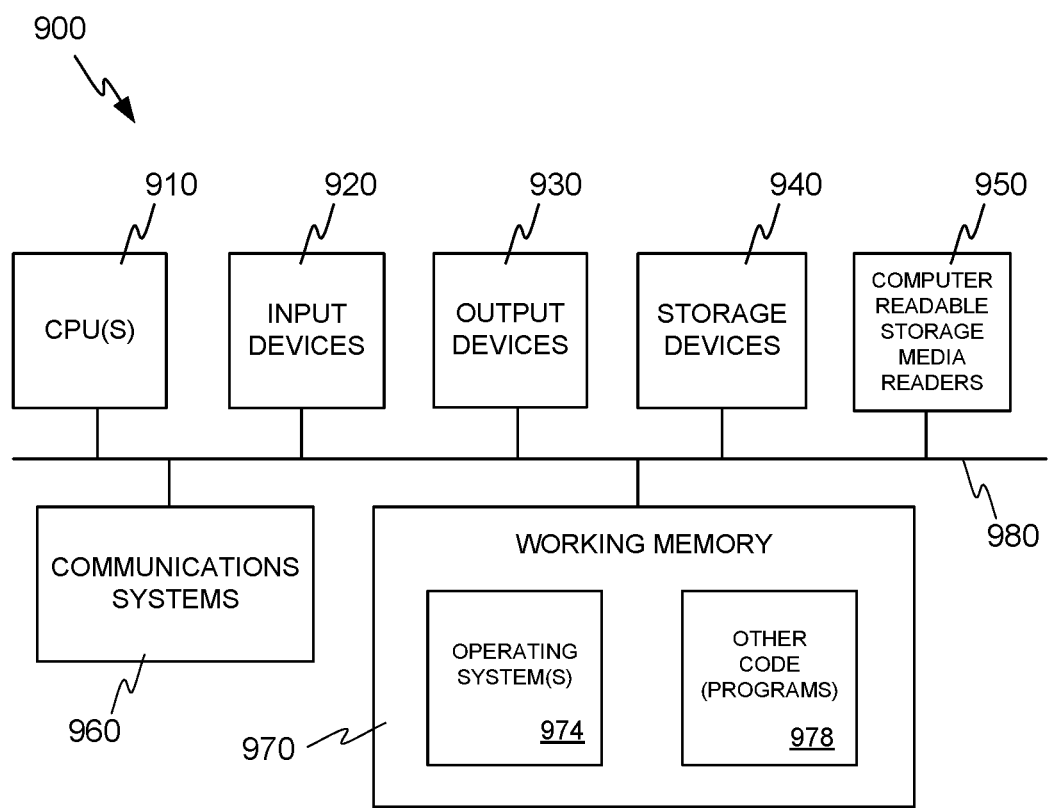
FIG. 9 is a block diagram illustrating an exemplary computer system upon which embodiments of the present invention may be implemented.

FIG. 9 is a block diagram illustrating an exemplary computer system 900 upon which embodiments of the present invention may be implemented. This example illustrates a computer system 900 such as may be used, in whole, in part, or with various modifications, to provide the functions of, for example, transaction risk evaluator 706, as well as other components and functions of the invention described herein.

The computer system 900 is shown comprising hardware elements that may be electrically coupled via a bus 980. The hardware elements may include one or more central processing units 910, one or more input devices 920 (e.g., a mouse, a keyboard, etc.), and one or more output devices 930 (e.g., a display device, a printer, etc.). The computer system 900 may also include one or more storage devices 940, representing remote, local, fixed, and/or removable storage devices and storage media for temporarily and/or more permanently containing computer-readable information, and one or more storage media reader(s) 950 for accessing the storage device(s) 940. By way of example, storage device(s) 940 may be disk drives, optical storage devices, solid-state storage device such as a random access memory ("RAM") and/or a read-only memory ("ROM"), which can be programmable, flash-updateable or the like.

The computer system 900 may additionally include a communications system 960 (e.g., a modem, a network card—wireless or wired, an infra-red communication device, a Bluetooth™ device, a near field communications (NFC) device, a cellular communication device, etc.) The communications system 960 may permit data to be exchanged with a network, system, computer, mobile device and/or other component as described earlier. The system 900 also includes working memory 970, which may include RAM and ROM devices as described above.

The computer system 900 may also comprise software elements, shown as being located within a working memory 970, including an operating system 974 and/or other code 978. Software code 978 may be used for implementing functions of various elements of the architecture as described herein.

It should be appreciated that alternative embodiments of a computer system 900 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

It will be recognized that embodiments of the invention improve the function of prior computer systems. For example, in the absence of transaction risk evaluator 706, a merchant 702 wishing to gain additional confidence in the viability of card-not-present sale transactions may have to contact card issuers individually for evaluations of account information and its possible correlation with past actual or suspected fraud. In embodiments of the invention, transaction risk evaluator provides a single point of contact for merchant 702, simplifying the process of obtaining a transaction risk evaluation for merchant 702. In addition, because transaction risk evaluator 706 may receive information from a number of issuers and merchants for inclusion in its database, the risk evaluation is improved. For example, without shared information, an individual issuer may not be able to determine that one of its cards was used at a point of purchase in common with a card from a different issuer reported as being used for fraud.

FIG. 10 illustrates an example format of a request message that may be sent from merchant 702 to risk evaluator 706 in accordance with embodiments of the invention. While the format of FIG. 10 includes 33 data fields, more or fewer data items may be included. Any one, any combination, or all of the items in the request message may be used in the evaluation of transaction risk, individually or in combinations. Different items may carry different weights in the evaluation of transaction risk. The risk contributions of the items in the merchant request message may be combined with other risk indicators to evaluate the risk of a sale transaction, for example to arrive at a transaction risk score.

Many different contributors to a risk score or other determination of transaction risk are possible. Table 1 below lists a number of examples, but many others may be used as well instead of, in combination with, or in addition to any of these.

TABLE 1

| Criterion | Effect on transaction risk |
|---|---|
| Any consumer-supplied transaction information item has been previously associated with fraud (account number, customer name, billing address, shipping address, email address, phone number, etc.) | Strongly increased |
| Account number previously reported as compromised | Increased |
| First ever online transaction conducted with account | Slightly increased |

TABLE 1-continued

| Criterion | Effect on transaction risk |
|---|---|
| Account was used at common point of purchase with other accounts reporting fraud | Increased |
| Account was used at common point of purchase with other accounts reporting fraud AND first ever online transaction conducted with account | Strongly increased |
| Email address or phone number doesn't match email address or phone number on file for account | Slightly increased |
| Customer has been fraud victim in the past | Increased |

In some embodiments, the pattern of use of an account, for example its transaction history, may be analyzed to evaluate the risk of a particular transaction. For example, if a longstanding account is used for the first time to conduct an online transaction, the transaction risk score or other estimate may be raised, because a first ever online transaction is something that might happen after compromise of an account that has never been used for online purchases before. However, the effect on the transaction risk estimate may be modest, because there are other plausible explanations for why an account is being used for the first time online. For example, the account holder may only recently have decided to obtain Internet access and begin an online presence.

However, if the account that is being used for the first time ever online is also suspected of being recently compromised, the effect on the transaction risk estimate may be greatly increased, because of the otherwise-unlikely coincidence of the suspected breach and the first-ever online transaction. That is, it may be considered more likely that the transaction is being conducted by a fraudster than that the account holder decided coincidentally to begin online purchases shortly after the suspected breach.

This scenario also shows how factors that may individually affect the risk estimate may be used in combination, and the contribution of their combination to the transaction risk may be more or less than the sum of their individual effects.

Similarly, if the phone number given by the customer during the entry of an online transaction does not match the phone number on file for the account holder at the issuer, the transaction risk estimate may be increased only slightly, as there are very plausible innocuous reasons for such a discrepancy. For example, the account holder may have given a landline phone number when opening the account, but may enter his or her cell phone number during the transaction. However, if the new phone number has also been used in prior known-fraudulent transactions, this combination of factors may strongly increase the transaction risk estimate.

The data format of FIG. 10 may also be convenient for use in providing batch transaction information from merchant 702 to transaction risk evaluator 706, as described above, so that transaction risk evaluator 706 can incorporate that information into its evaluations. Merchant 702 may provide details of some or all of its card transactions, whether suspicious or not.

FIG. 11 illustrates an example format of a response message that may be sent from transaction risk evaluator 706 to merchant 702 in embodiments of the invention. Preferably, the response message includes enough detail that it can be matched with its corresponding request message, for example a transaction number or the like. The response message may duplicate some of the information from the request message, for example the account number and customer name. While the format of FIG. 11 includes 37 data fields, more or fewer data items may be included. In the example of FIG. 11, the response message includes a transaction risk score (field 4), which provides an analytical indication of the statistical fraud risk in the transaction.

In addition, the response message may include a list of one or more codes or other explanatory items that indicate reasons for the particular transaction risk estimate. For example, the response message may indicate that certain data fields entered by the customer during the transaction did not match the information on file for the account being used. Or the response message may indicate results from the analyses performed by transaction risk evaluator 706. For example, a reason code may indicate that the account has a suspicious transaction history, that the account has been reported or suspected as having been compromised, that an item of information entered by the customer has previously been associated with fraud, or may indicate other analysis results.

Table 2 below lists some possible reason codes.

TABLE 2

| | Example Reason Codes for Response Message |
|---|---|
| 1 | Suspicious Name |
| 2 | Suspicious Address |
| 3 | Suspicious Phone |
| 4 | Suspicious Email |
| 5 | Compromise Card History |
| 6 | Recent Fraud Claims Activity |
| 7 | Suspicious Purchase History |
| 8 | Suspicious Shipping Address |
| 9 | Suspicious Device (Phone, Tablet, Laptop, etc.) |

Other reason codes may be used as well.

While the transaction risk score is preferably determined and provided to the requesting merchant in real time, preliminary processing may be done in order to facilitate the rapid determination of transaction risk scores from customer-entered information. For example, the common point of purchase (CPP) backtracing described in Provisional U.S. Patent Application No. 62/174,432 (previously incorporated by reference) may be performed periodically on a batch basis, so that a list of potentially-compromised accounts can be available for rapid access by simple table lookup rather than having to perform the backtracing in real time.

The analyses performed by transaction risk evaluator 706 may involve information and data from several sources, for example:

Bank Contributed Transaction Data—This kind of information may include transaction records from accounts held at a number of financial institutions, as well as indications of which accounts have been the object of prior fraud claims, which have been recognized as having been used at a common point of purchase with other compromised accounts, or the like.

Merchant Contributed Transaction Data—Merchants may provide data from past transactions, for example indications of accounts that have been previously declined due to the use of particular devices, due to geolocation information, due to the merchant's business rules, because the accounts were known to be associated with fraud, due to excessive chargebacks, or the like.

Bank Contributed Personal Identifying Information (PII)—Banks may contribute their customers' identifying information, which can be used to cross reference the customer-provided transaction information with account ownership records, or the like.

Merchant Contributed Purchaser Data—Merchants may contribute purchaser information.

Other sources of information may be used as well. The evaluation of the risk of any particular transaction may be based on any one, any combination, or all of the available data sources and databases. Information from the various data sets may be cross referenced to increase the scope of the risk analysis. For example, purchaser information entered by the customer in initiating a transaction may be cross referenced with bank-contributed personal identifying information, so that the customer's history can be evaluated, for example to see if the customer has previously been the victim of fraud, whether other accounts associated with the customer may have negative histories, or the like. Once the customer has been identified, his or her transaction histories at multiple financial institutions may be investigated.

Besides providing analysis results such as transaction risk scores in response messages to merchants, transaction risk evaluator 706 may exchange information with issuers such as issuer 704 for various purposes, as is shown in FIG. 7. For example, transaction risk evaluator 706 receives contributed information as discussed above, which is populated into the databases used in the risk analysis. In addition, transaction risk evaluator 706 may transmit its analysis results to the appropriate issuers. For example, when transaction risk evaluator 706 detects a transaction with a high fraud risk, it may inform the issuer of the account being used in the transaction, so that the issuer may conduct its own investigation, prepare for a customer inquiry about a denied transaction, or the like.

While a detailed description of presently preferred embodiments of the invention has been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A merchant transaction system, comprising:
   a processor; and
   memory, the memory holding data and instructions, wherein the instructions, when executed by the processor, cause the system to:
   receive, at a merchant, a sale transaction request from a customer for a first card-not-present sale transaction, the sale transaction request containing information including a number of an account being used in the sale transaction and personal identifying information associated with the customer;
   transmit, over a first electronic network, a customer information request to an issuer of the account being used in the sale transaction, wherein the customer information request includes a request for personal identifying information and account history information associated with the customer;
   receive, over the first electronic network, personal identifying information and account history information associated with the customer;
   determine a one-bank risk score for the customer using the personal identifying information from the sale transaction request, the personal identifying information from the issuer of the account, and the account history information, wherein the one-bank risk score decreases based on instances of fraud victimization or other negative events from the account history information;
   transmit, over a second electronic network, a first transaction risk request message to a transaction risk evaluator, wherein the first transaction risk request includes information including a number of the account being used in the sale transaction and personal identifying information associated with the customer received in the sale transaction request;
   receive, over the second electronic network, a first reply message from the transaction risk evaluator, the reply message indicating a first level of risk associated with the sale transaction, multiple data items associated with the first level of risk, and a number of data items that contributed to the first level of risk, wherein determining the first level of risk includes analysis of multiple account histories of multiple customers across multiple banks, wherein the account histories of customers across the multiple banks are not accessible by the merchant, wherein each of the multiple data items were retrieved from the account histories of customers across the multiple banks, wherein each of the multiple data items were determined by the transaction risk evaluator to be correlated with data items associated with the sale transaction, and wherein the multiple data items include a total number of cards having reported fraudulent transactions in a same day as the first card-not-present sale transaction and across a back trace window for the merchant;
   assign a weight to each data item received from the first reply message, wherein each data item is assigned a weight that represents at least one effect on transaction risk, wherein the at least one effect on transaction risk comprises at least one of increased, slightly increased, or strongly increased;
   determine a multi-bank risk score using the one-bank risk score, the first level of risk, the multiple data items associated with the first level of risk, and the weight assigned to each data item, wherein the multi-bank risk score quantifies cumulative risks uncovered in an analyses of information associated with the sale transaction, the account being used in the sale transaction, and the customer;
   determine that the first card-not-present sale transaction is fraudulent based at least in part on the multi-bank risk score and content of the first reply message;
   transmit, over the first electronic network, a request to the issuer of the account being used in the sale transaction;
   receive, over the first electronic network, a second reply message from the issuer of the account being used in the sale transaction, the second reply message indicating approval of the sale transaction by the issuer;
   determine to decline the first card-not-present sale transaction based at least in part on content of the second reply message;
   identify, using the total number of cards having reported fraudulent transactions in the same day as the first card-not-present sale transaction and across the back trace window for the merchant, a compromise period of time including a compromise start date and compromise end date;
   provide, to the transaction risk evaluator, information about instances of fraud detected by the merchant, for use by the transaction risk evaluator in an evaluation of future transactions, wherein the instances of fraud include the declined first card-not-present sale transaction and an indication of the compromise period of time including the compromise start date and compromise end date;

output, to the customer, an indication that the first card-not-present sale transaction has been declined;
receive a second sale transaction request from the customer for a second card-not-present sale transaction;
transmit, over the second electronic network, a second transaction risk request to the transaction risk evaluator;
receive, over the second electronic network, a second reply message indicating a second level of risk associated with the second card-not-present sale transaction, wherein the second level of risk is determined using information associated with third party transactions processed since the second card-not-present sale transaction and information associated with the second card-not-present sale transaction, wherein the information associated with the second card-not-present sale transaction includes declining of the second card-not-present sale transaction and data items associated with the declining;
determine an updated multi-bank risk score based on the declined second card-not-present sale transaction and the second level of risk;
determine to decline the second sale transaction based on the updated multi-bank risk score; and
output, to the customer, an indication that the second card-not-present sale transaction has been declined.

2. The merchant transaction system of claim 1, wherein the instructions, when executed by the processor, further cause the system to decline to proceed with the sale transaction based on the second reply message, despite approval of the transaction by the issuer.

3. A system for identifying potentially illicit purchases, the system comprising:
a processor; and
memory, the memory holding data and instructions, wherein the instructions, when executed by the processor, cause the system to:
maintain one or more databases, the one or more databases containing transaction information for a number of accounts held at a number of account holders, and containing information indicating past actual or suspected illicit activity relating to at least some of the accounts;
receive, over an electronic network, a request message originating from a merchant during the processing of a first card-not-present sale transaction initiated by a customer and being conducted by the merchant, the request message containing information including at least the number of an account being used in the sale transaction and a one-bank risk score for the customer, wherein the one-bank risk score was generated by the merchant using personal identifying information of the customer from the transaction request and personal identifying information received from an issuer of the account, wherein the one-bank risk score decreases based on instances of fraud victimization or other negative events from account history information;
compare information from the request message with information in the one or more databases, to identify correlations of the information from the request message with past actual or suspected illicit activity;
ascertain that the account being used in the sale transaction was previously used at a point of purchase in common with one or more other accounts reported to have been used fraudulently;
determine a level of risk associated with the sale transaction, multiple data items associated with the level of risk, and a number of data items that contributed to the level of risk, wherein determining the level of risk includes analysis of multiple account histories of multiple customers across multiple banks, wherein the account histories of customers across the multiple banks are not accessible by the merchant, wherein each of the multiple data items were retrieved from the account histories of customers across the multiple banks, and wherein each of the multiple data items were determined to be correlated with data items associated with the sale transaction, and wherein the multiple data items include a total number of cards having reported fraudulent transactions in a same day as the first card-not-present sale transaction and across a back trace window for the merchant;
assign a weight to each of the multiple data items, wherein each data item is assigned a weight that represents an effect on transaction risk, wherein the effects on transaction risk comprise at least one of increased, slightly increased, or strongly increased;
determine a multi-bank risk score using the one-bank risk score, the level of risk, the multiple data items associated with the level of risk, and the weights assigned to each data item, wherein the multi-bank risk score quantifies cumulative risks uncovered in the analyses analysis of information associated with the sale transaction, the account being used in the sale transaction, and the customer;
identify, using the total number of cards having reported fraudulent transactions in the same day as the first card-not-present sale transaction and across the back trace window for the merchant, a compromise period of time including a compromise start date and compromise end date;
construct a response message based on the identified correlations and on the fact that the account was previously used at the point of purchase in common with one or more other accounts reported to have been used fraudulently, the message indicating the multi-bank risk score associated with the sale transaction and an indication of the compromise period of time including the compromise start date and compromise end date; and
provide the merchant access to the response message over the electronic network;
receive information about instances of fraud detected by the merchant for use in evaluation of future transactions, wherein the instances of fraud include the first card-not-present sale transaction;
receive a request message originating from the merchant during the processing of a second card-not-present sale transaction;
determine a second level of risk associated with the second card-not-present sale transaction, wherein the second level of risk was determined using information associated with third party transactions processed since the second card-not-present sale transaction and information associated with the second card-not-present sale transaction, wherein the information associated with the second card-not-present sale transaction includes declining of the second card-not-present sale transaction and data items associated with the declining;
determine an updated multi-bank risk score based on the declined second card-not-present sale transaction and the second level of risk;
output the updated multi-bank risk score to the merchant; and output, to the customer, an indication that the card-not-present sale transaction has been declined.

4. The system for identifying potentially illicit purchases of claim 3, wherein the access to the response message is provided in real time during the conduct of the sale transaction.

5. The system for identifying potentially illicit purchases of claim 3, wherein the response message includes an itemized list of one or more items of information from the request message that correlated with past actual or suspected illicit activity.

6. The system for identifying potentially illicit purchases of claim 3, wherein the instructions, when executed by the processor, cause the system to ascertain that a shipping address provided for the sale transaction has been previously associated with illicit activity.

7. The system for identifying potentially illicit purchases of claim 3, wherein the instructions, when executed by the processor, cause the system to ascertain that a billing address provided for the sale transaction has been previously associated with illicit activity.

8. The system for identifying potentially illicit purchases of claim 3, wherein the instructions, when executed by the processor, cause the system to ascertain that an electronic mail address provided for the sale transaction has been previously associated with illicit activity.

9. The system for identifying potentially illicit purchases of claim 3, wherein the instructions, when executed by the processor, cause the system to ascertain that a telephone number provided for the sale transaction has been previously associated with illicit activity.

10. The system for identifying potentially illicit purchases of claim 3, wherein the instructions, when executed by the processor, cause the system to ascertain that a transaction history of the account being used in the sale transaction suggests illicit activity.

11. The system for identifying potentially illicit purchases of claim 3, wherein the instructions, when executed by the processor, further cause the system to compute a transaction risk score for the sale transaction, and to include the transaction risk score in the response message.

12. The system for identifying potentially illicit purchases of claim 11, wherein the instructions, when executed by the processor, further cause the system to include in the response message identification of one or more factors that contributed to the transaction risk score.

13. The system for identifying potentially illicit purchases of claim 3, wherein the instructions, when executed by the processor, cause the system to compare information from the request message other than the account number with information in the one or more databases to identify correlations of the information from the request message with past actual or suspected illicit activity in relation to one or more accounts other than the account being used in the transaction.

14. The system for identifying potentially illicit purchases of claim 13, wherein at least one of the one or more other accounts is issued by an institution other than the issuer of the account being used in the sale transaction.

15. The system for identifying potentially illicit purchases of claim 3, wherein the instructions, when executed by the processor, further cause the system to receive at least some of the information indicating past actual or suspected illicit activity relating to at least some of the accounts from issuers of those accounts.

\* \* \* \* \*